(12) United States Patent
Chen et al.

(10) Patent No.: US 11,089,508 B2
(45) Date of Patent: *Aug. 10, 2021

(54) METHOD AND ARRANGEMENT FOR DISTRIBUTING INFORMATION DURING BROADCAST DELIVERY

(71) Applicant: Telefonaktiebolaget LM Ericsson (publ), Stockholm (SE)

(72) Inventors: Kun Chen, Shanghai (CN); Jie Ling, Shanghai (CN); Shiyuan Xiao, Shanghai (CN); Jinyang Xie, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,978

(22) Filed: Nov. 14, 2019

(65) Prior Publication Data

US 2020/0084660 A1 Mar. 12, 2020

Related U.S. Application Data

(63) Continuation of application No. 14/413,481, filed as application No. PCT/SE2013/050395 on Apr. 11, 2013, now Pat. No. 10,511,997.

(30) Foreign Application Priority Data

Jul. 9, 2012 (WO) ................ PCT/CN2012/078388
Aug. 8, 2012 (WO) ................ PCT/CN2012/079809

(51) Int. Cl.
*H04L 1/08* (2006.01)
*H04W 28/04* (2009.01)
(Continued)

(52) U.S. Cl.
CPC ........... *H04W 28/04* (2013.01); *H04L 1/0035* (2013.01); *H04L 1/0042* (2013.01);
(Continued)

(58) Field of Classification Search
CPC ..... H04W 72/04; H04W 88/08; H04W 76/00; H04W 72/005; H04W 28/04; H04W 4/06;
(Continued)

(56) References Cited

U.S. PATENT DOCUMENTS

2004/0114576 A1 6/2004 Itoh et al.
2005/0182995 A1 8/2005 Curcio et al.
(Continued)

FOREIGN PATENT DOCUMENTS

CN 1993933 A 7/2007
EP 1 746 773 A1 1/2007
(Continued)

OTHER PUBLICATIONS

Summary of Japanese Office Action dated Apr. 23, 2019 issued in Japanese Patent Application No. 2018/021160. (14 pages).
(Continued)

*Primary Examiner* — Hassan A Phillips
*Assistant Examiner* — Prenell P Jones
(74) *Attorney, Agent, or Firm* — Rothwell, Figg, Ernst & Manbeck, P.C.

(57) ABSTRACT

A BM-SC, and a method therein for transmitting data file by broadcast session to at least one UE, in a radio communication system; and a UE and a method therein for receiving a broadcast session of transmission of a data file from a BM-SC are provided. The method in the BM-SC comprises determining to transmit the data file to the at least one UE, and determining a FEC redundancy level to use for the transmission. The method also comprises transmitting, to the at least one UE, the data file using the determined FEC
(Continued)

redundancy level and an indication of the determined FEC redundancy level.

15 Claims, 10 Drawing Sheets

(51) Int. Cl.
  *H04W 4/06*  (2009.01)
  *H04L 1/00*  (2006.01)
  *H04L 1/18*  (2006.01)
  *H04L 1/22*  (2006.01)
  *H04L 12/18*  (2006.01)
  *H04W 72/00*  (2009.01)

(52) U.S. Cl.
  CPC .............. *H04L 1/0043* (2013.01); *H04L 1/08* (2013.01); *H04L 1/1887* (2013.01); *H04L 1/22* (2013.01); *H04L 12/1886* (2013.01); *H04W 4/06* (2013.01); *H04W 72/005* (2013.01)

(58) Field of Classification Search
  CPC ... H04L 1/08; H04L 12/1886; H04L 12/1887; H04L 1/0035; H04L 1/0042; H04L 1/0043
  See application file for complete search history.

(56) References Cited

U.S. PATENT DOCUMENTS

| | | | |
|---|---|---|---|
| 2006/0075321 A1 | 4/2006 | Vedantham et al. | |
| 2007/0109974 A1* | 5/2007 | Cutillo | H04M 11/062 370/254 |
| 2007/0211720 A1* | 9/2007 | Fuchs | H04L 12/1836 370/390 |
| 2008/0025300 A1* | 1/2008 | Lide | H04W 28/22 370/389 |
| 2008/0192661 A1 | 8/2008 | Hammamoto et al. | |
| 2008/0285496 A1 | 11/2008 | Fuchs et al. | |
| 2009/0177942 A1 | 7/2009 | Hannuksela et al. | |
| 2010/0223533 A1 | 9/2010 | Stockhammer et al. | |
| 2010/0312552 A1 | 12/2010 | Zheng et al. | |
| 2010/0325515 A1 | 12/2010 | Lohmar et al. | |
| 2012/0151261 A1 | 6/2012 | Suneya | |
| 2013/0072167 A1 | 3/2013 | Aguirre et al. | |
| 2013/0215813 A1 | 8/2013 | Kotecha et al. | |
| 2013/0267202 A1 | 10/2013 | Palanigounder et al. | |
| 2013/0301424 A1 | 11/2013 | Kotecha et al. | |

FOREIGN PATENT DOCUMENTS

| | | |
|---|---|---|
| JP | H11-196088 A | 7/1999 |
| JP | 2001-045098 A | 2/2001 |
| JP | 2002330118 A | 11/2002 |
| JP | 2006262288 A | 9/2006 |
| JP | 2007-74413 A | 3/2007 |
| JP | 2007522750 A | 8/2007 |
| JP | 2007531458 A | 11/2007 |
| JP | 2008153800 A | 7/2008 |
| JP | 2008160499 A | 7/2008 |
| JP | 2012089990 A | 5/2012 |
| JP | 2012129750 A | 7/2012 |
| WO | 2005/119969 A1 | 12/2005 |

OTHER PUBLICATIONS

3GPP TS 26.346 V11.1.0 (Dec. 2012), 3rd Generation Partnership Project; Technical Specification Group Services and System Aspects; Multimedia Broadcast/Multicast Service (MBMS); Protocols and codecs (Release 11). (168 pages).

First Office Action dated Mar. 27, 2017 in corresponding Chinese Application No. 201380046657.5, 13 pages (English translation).

Japanese Office Action issued in Application No. 2015-521580 dated Feb. 10, 2017, with English summary, 17 pages.

"Universal Mobile Telecommunications System (UMTS); LTE; Transparent end-to-end Packet-switched Streaming Service (PSS); Protocols and codecs (3GPP TS 26.234 version 9.5.0 Release 9)" ETSI TS 126 234 V9.5.0 (Jan. 2011) Technical Specification, 191 pages.

* cited by examiner

METHOD AND ARRANGEMENT FOR DISTRIBUTING INFORMATION DURING BROADCAST DELIVERY

CROSS-REFERENCE TO RELATED APPLICATIONS

This application is a continuation of U.S. application Ser. No. 14/413,481, having a section 371(c) date of Jan. 8, 2015, which is the U.S. National Stage Entry of International Patent Application No. PCT/SE2013/050395, filed on Apr. 11, 2013, which claims priority to: 1) International Patent Application No. PCT/CN2012/079809, filed on Aug. 8, 2012 and 2) International Patent Application No. PCT/CN2012/078388, filed on Jul. 9, 2012. The above identified applications are incorporated by this reference.

TECHNICAL FIELD

The present disclosure relates to broadcasting of information in a radio communication system, and a BM-SC and a UE, capable of handling such broadcasted information.

BACKGROUND

Multimedia Broadcast and Multicast Services (MBMS) is a broadcasting service offered via cellular networks. Enhanced MBMS (eMBMS) is correspondingly used to denominate MBMS service in Evolved Packet Systems, including Evolved Universal Terrestrial Radio Access Network (E-UTRAN) for Long Term Evolution (LTE) cellular networks and UTRAN for e.g. Universal Mobile Telecommunications System, (UMTS) cellular networks. One simplified example of an eMBMS over LTE solution architecture is illustrated in FIG. 1.

The architecture 100 of FIG. 1 comprises at least one Broadcast Multicast Service Center (BM-SC) 110, which is an entity capable of providing MBMS or eMBMS by distributing content provided from one or more content service providers 120, where a content service provider 120 typically comprise a content store (not shown), and a live encoder (not shown), capable of providing content feeds e.g. in the form of satellite feeds, live feeds and/or Content Delivery Network (CDN) feeds to the BM-SC 110 under supervision of a Broadcast operations function 130, which is typically capable of interacting with the BM-SC 110. The BM-SC 110 is connected to an access network, typically comprising a plurality of access nodes, but for simplicity here represented by one single access node, eNB 140, via a Multimedia Broadcast Multicast Services Gateway (MBMS-GW) 150, where the eNB 140 is capable of distributing the provided content feeds to User Equipments (UE) located within range of the access network, via unicast or multicast. Here such UEs are represented by one single UE, UE 160.

In order to be able to remedy failure to receive the content feeds correctly, by at least one of the UEs, the architecture described above is typically also provided with functionality which is configured to enable the BM-SC 110 to re-transmit parts of the content feeds to those UEs 160 reporting failure to receive at least parts of the content feeds. Such a feature is typically referred to as file repair, or more specifically HTTP Unicast File repair. For enabling file repair, the BM-SC 110 is therefore normally provided with at least one, but typically with a plurality of file repair servers (not shown), capable of providing lost or corrupted file fragments of the content feeds to each requesting UE, by way of re-transmission of the previously transmitted data.

As stated above, eMBMS is a broadcasting service offered via Evolved Packet Systems including E-UTRAN LTE and UTRAN access. Two exemplifying use cases are described below:

(1) To deliver e.g. sport games video content to mobile phones highly gathered in a stadium. eMBMS system can use the MBMS Download Delivery Method User Datagram Protocol, UDP/File Transport over Unidirectional Transport (FLUTE) as protocol to deliver Live TV content to terminals. Media segments according to Apple's HTTP Live Streaming (HLS) Protocol or according to DASH are delivered as files over MBMS Download, (2) Distribution of Android update. eMBMS system can use the MBMS Download Delivery Method (UDP/FLUTE) as protocol to deliver popular files, such as e.g. Android update, YouTube clip preloading or major news events.

In this disclosure, the terms terminal, MBMS receiver, MBMS client and UE are used to denote a device or apparatus which is capable of receiving a broadcast transmission via MBMS or eMBMS, as described herein.

MBMS Download enables data file delivery on unidirectional MBMS bearers and improves file reception reliability by applying FEC technology. However, even though FEC is used, 100% reliability for data file delivery cannot be guaranteed.

Therefore, two other types of error recovery methods are defined, and optionally used, after an MBMS transmission has ended. With the Point-to-Point (PTP), File Repair method, an unsatisfied UE can fetch missing data using HTTP. The Point-to-Multipoint (PTM) File Repair method allows the BM-SC to send further MBMS data after the actual MBMS data transfer. The MBMS Service Layer specification does, however, not define any combinations or sequences of file repair methods.

MBMS download can be used to deliver an arbitrary number of data files from a single source to many UEs. MBMS Download may use the FLUTE [RFC3926] protocol for file delivery. FLUTE is designed for massive file delivery over unidirectional links, such as e.g. for digital broadcasts. Since HTTP and TCP are not feasible for PTM communication, a newly developed protocol is used. A typical eMBMS flute transmission according to the prior art is described below with reference to FIG. 2.

According to FIG. 2, which is a signalling diagram which in a simplified manner is illustrating MBMS or eMBMS downloading between a BM-SC 200 and MBMS or eMBMS enabled UEs, here represented by UEs 220a,220b, via a communication network (NW) 220 capable of handling MBMS or eMBMS respectively. From hereinafter the mentioning of MBMS is to be interpreted as meaning MBMS or eMBMS, and UEs may alternatively be referred to as MBMS or eMBMS clients. In FIG. 2 such a network infrastructure is represented by a Gateway (GW) 210 connecting NW 220 to the BM-SC 200, thereby providing access between the UEs, 220a,220b and the BM-SC 200.

In a first step 200, an MBMS bearer is established and an MBMS session is started by BM-SC 200. All files to be received by a UE require an entry in a FLUTE File Delivery Table, FDT, which is provided using FLUTE FDT Instances, The UEs 220a,220b can then use the retrieved FDT instance to decode the subsequently received FLUTE object packets and recover a respective file object.

Consequently, UEs 220a, 220b are able to receive a first FDT instance transmitted by BM-SC 200, in step 200, followed by and one or more files together with Forward Error Correction (FEC) data, in a subsequent step 220, A Forward Error Correction, FEC, building block defines e.g. the FEC code (RFC3452) and also an object partitioning scheme. The object partitioning scheme describes the split of the object data into UDP packet payloads. Each file will be encoded with one FEC encoding ID and generate the source encoding symbols and repair symbols. The applied FEC is included in the respective FDT instance.

The described procedures are typically repeated, here as illustrated with steps 230 and 240, until the MBMS session has been transmitted, here indicated by MBMS session stop 250. After the transmission has been completed the UEs 220a,220b will be able to report the result of the reception and, if required, to request file repair of content which has not been successfully received. Such a request is illustrated with step 260, where UE 220a requests for file repair, and where, in subsequent step 270, a file repair procedure is initiated, allowing any UE, here UE 220a, a second chance to receive missing file content, and in order to obtain a successful reception of the requested file content. The same procedure can be executed also for UE 220b in case this is found to be required.

Before the BM-SC 200 starts transmitting or broadcasting FLUTE packets to the UEs 220a,220b, the BM-SC 200 needs to send out user service description, including necessary information. During the delivery session, the BM-SC 200 also needs to send out FDT instances to describe the delivered file objects, as already mentioned above.

The UEs 220a,220b can use FDT instance information to know the file size, FEC encoding ID and FEC partition information. As FLUTE is based on UDP, generally the UEs 220a,220b cannot however know which packet is the last packet for one data file object unless the following conditions are satisfied: (1) the UE receives an A flag (session close flag) or B flag (object close flag), or (2) the FDT instance expire time is reached.

In most cases, the broadcast session will broadcast the data files with some FEC overhead, or FEC redundancy level, to increase the possibility of successful recovery. But the FDT instance doesn't describe how much FEC overhead, or FEC redundancy level, that is added to the source file object. Two possible scenarios are described below.

Scenario 1: In a live streaming case, one delivery or broadcasting session has no associated delivery procedure for file repair. As a consequence of lack of FEC overhead, or FEC redundancy level, a UE will keep receiving packets even if the packet loss rate already exceeds the applied FEC overhead, or the FEC redundancy level percentage for one segment.

Scenario 2: In an on-request content delivery case, an Associated Delivery Procedure Description (ADPD) procedure is enabled for one delivery session, or broadcast session. In this case the UE identifies missing source symbols; and executes the following steps: i) checks that PTP file repair is defined for the MBMS Download session (thus, file repair parameters are available), ii) waits until the file repair procedure can be started, wherein the UE calculates a (random) back-off time and selects (randomly) a file repair server (BM-SC), and iii) the client sends a file repair request to the selected file repair server.

The starting time of the file repair procedure for the MBMS Download is the expiration time of the FDT instance at latest. The expiration time is given through the "expires" XML attribute of the FDT instance.

A back-off mode for MBMS download provides information as to when a receiver, i.e. a UE, that did not correctly receive some data from the MBMS sender, i.e. the BM-SC, during a broadcast transmission session, can request a repair session. A random time period may be defined in the mode that refers to the time window length over which a UE should calculate a random time for the initiation of the file repair procedure.

An operator cannot get a best guess about how many users may trigger file repair for one download, or broadcast, session until the file repair back-off mode has been reached when the broadcast delivery for this data file is finished and the UEs start sending file repair requests to one or more repair servers. In some extreme case there may be a huge amount of file repair requests during the file repair window for the same download session. Such a request flood will consume a lot of unicast bandwidth and the file repair server(s) may run a great risk of being overloaded. Preventing a potential file repair flood is especially valuable for a large file delivery, such as e.g. an Android update, as the small repair rate will still introduce a large repair amount in the network.

SUMMARY

It is an object of the present document to eliminate, or reduce, at least some of the deficiencies mentioned above. More specifically, a method for providing a FEC redundancy level from a BM-SC to a UE and a corresponding method for handling such a FEC redundancy level at the UE, as well as a BM-SC and a UE adapted for executing such methods, are provided.

According to a first aspect, a method executed in a BM-SC for transmitting data in a broadcast session to at least one UE in a radio communication system, is provided. According to this method it is first determined at the BM-SC that data is to be transmitted to at least one UE. A FEC, redundancy level, indicative of the amount of FEC redundancy to be applied for the data transmission is then determined, after which the data and an indication of the FEC redundancy level is transmitted to the one or more UEs.

The indication of the FEC redundancy level may be inserted into an updated FDT instance, as a FEC redundancy level attribute, after which the updated FDT instance is transmitted to the one or more UEs.

The described method may also comprise the further step of receiving information from at least one of the at least one UE, indicating to the BM-SC that the respective UE could not successfully decode the transmitted data, according to the applied FEC redundancy level.

In addition to receiving the suggested type of information from a respective UE, the receiving step may comprise receiving also an indication of the packet loss rate.

Furthermore, according to a first embodiment, a BM-SC may respond to reception of information from at least one UE of failure to decode the transmitted data by determining to increase the FEC redundancy level to be used for subsequent data transmissions, and transmitting an indication of the updated FEC redundancy level to the one or more UEs.

According to a second embodiment, the BM-SC may instead determine to abort the data transmission to the at least one UE, and transmit information of the abortion to each respective UE. In addition, the BM-SC may reschedule transmission of the aborted data to a later point in time.

According to a third embodiment, the BM-SC may determine to extend the file repair window applied during the data transmission, and apply the extended file repair window for subsequent data transmission.

According to a fourth embodiment the BM-SC may cancel the file repair window applied during the data transmission.

According to a fifth embodiment, the BM-SC may save information about the number of UEs reporting failure to successfully decode data and a packet loss percentage for the at least one UE of the at least one UE intended to receive the transmitted data, and retransmit a certain percentage of repair symbols, based on said saved information, or retransmit data using another time slot.

According to another aspect, a method, executed in a UE, for receiving data in a broadcast session transmitted from a BM-SC is provided, where the UE is receiving data transmitted from a BM-SC and a FEC level redundancy level applied when transmitting the data, and the UE is decoding the received data employing the received FEC redundancy level.

The FEC redundancy level may be provided to the UE in a FDT, instance, e.g. as an attribute provided for this purpose.

The suggested method typically comprise the further steps of determining whether or not the transmitted data could be successfully decoded, and transmitting information to the BM-SC, indicating failure to decode the transmitted data, in case the decoding was considered unsuccessful.

The transmitting step may also comprise indicating the packet loss rate of the transmission to the BM-SC.

In addition, the suggested method may comprise the further steps of determining a ratio between the number of packets of the transmitted data which were not successfully decoded and the number of packets which were successfully decoded, determining the relationship between the FEC redundancy level and the determined ratio, and aborting reception of any further packets of the transmitted data, in case the ratio is higher than FEC redundancy level and in case file repair is not enabled for the transmitted data.

Furthermore, the UE may also proceed by indicating to the BM-SC that file repair will be requested after abortion of the initiated broadcast session in order to receive data not successfully decoded in the requested file repair procedure.

According to yet another aspect a BM-SC for transmitting data via a broadcasting session, to at least one UE in a radio communication system, is provided. The BM-SC comprise a processor and a computer readable memory, capable of storing instructions which, when executed by the processor causes the processor to: determine to transmit data to the at least one UE; determine a FEC redundancy level to use for the transmission, and to transmit, to the at least one UE, the data, applying the determined FEC redundancy level, and an indication of the determined FEC redundancy level.

The processor may be adapted to update a FDT instance with the determined FEC redundancy level, i.e. by making use of the already used FDT instance.

The memory may be adapted such that it is capable of storing instructions which when executed by the processor causes the processor to receive information from at least one UE of the at least one UE, indicating to the BM-SC that the at least one UE could not successfully decode the data file according to the FEC redundancy level applied for transmitting the data file, the information also indicating a packet loss rate.

The BM-SC may receive information from at least one UE of the at least one UE indicating to the BM-SC that the at least one UE could not successfully decode the data file, wherein such information comprises receiving a Reception Report Request indicating the packet loss rate to the BM-SC.

According to a first embodiment, the memory may also be capable of storing instructions which when executed by the processor causes the processor to determine to increase the FEC redundancy level, and to continue transmitting, to the at least one UE: a subsequent packet of the data file using the increased FEC redundancy level, and an indication that the increased FEC redundancy level is to be applied from hereinafter.

According to a second embodiment, the memory may be capable of storing instructions which when executed by the processor causes the processor to determine to abort the transmission of the data file to the at least one UE (1000), and to transmit information to the at least one UE (1000) that the transmission of data is aborted. The memory may also be capable of storing instructions which when executed by the processor causes the processor to reschedule the transmission of data to a later point in time.

According to a third embodiment, the memory may be capable of storing instructions which when executed by the processor causes the processor to determine to extend a file repair window following the termination of transmission of data to the at least one UE and to apply the extended file repair window for a file repair session following the termination of the transmission of the data file.

According to a fourth embodiment the memory is capable of storing instructions which when executed by the processor causes the processor to determine to cancel a file repair window which should follow the termination of transmission of data to the at least one UE.

According to a fifth embodiment, the memory is capable of storing instructions which when executed by the processing unit causes the processing unit to save information about the number UEs reporting failure to successfully decode the data file and a packet loss percentage for the at least one UE of the at least one UE intended to receive the data file, and based on said saved information, to retransmit a certain percentage of repair symbols after the termination of transmission of data to the at least one UE, or using another time slot in the broadcast session to retransmit the file.

According to another aspect, a UE, adapted for receiving a broadcast session of transmission of a data file from a BM-SC is provided. The UE comprise a processor and a memory capable of storing instructions which when executed by the processor (1050) causes the processor (1050) to: receive a transmission from the BM-SC, comprising the data file and an indication of a FEC redundancy level used to transmit the data, and to decode the received transmission employing the indicated FEC redundancy level.

The memory may be capable of storing instructions which when executed by the processor causes the processor to decode the received packet or data file according to the received FEC redundancy level, wherein if the decoding of the received transmission is unsuccessful, then the processor is further adapted to transmit information to the BM-SC indicating that the UE could not successfully decode the data file.

The UE may be configured to also transmit information to the BM-SC indicating that the UE could not successfully decode the data file, comprising sending a Reception Report Request indicating the packet loss rate to the BM-SC.

The memory may be further capable of storing instructions which when executed by the processor causes the processor to receive a plurality of packets, to determine a ratio between the number of packets which were not successfully decoded and the number of packets which were received, to determine a relationship between the FEC redundancy level and the determined ratio, and to abort the reception of further packets of the same data file within the broadcast session and if the ratio is higher than the FEC redundancy level, and if the file repair is not enabled for the delivered data file.

In addition, the memory may be further capable of storing instructions which when executed by the processor causes the processor to indicate to the BM-SC that a file repair session with the BM-SC will be requested after the termination of the broadcast session in order to receive a retransmission of those packets which were indicated to the BM-SC as not successfully decoded.

The BM-SC, the UE and the respective method therein may have several advantages. One advantage is that the FEC redundancy level information is delivered to the UE and enables the UE to determine how many packets are being successfully received of the data file from the BM-SC and how many packets are not successfully received. The UE may trigger early action as soon as the packet loss exceeds the FEC redundancy level and before the FDT instance expires. (a) For dash streaming, if the FEC redundancy level information is included, the UE can make a quick decision: drop the total segment if the packet loss for this segment already exceed the FEC redundancy level. Enable the UE to take early action if the segment cannot be recovered. Otherwise the UE must wait until the FDT instance expire time is reached before any action may be taken. (b) For on-request content, whenever the UE's packet loss rate exceeds the FEC redundancy level, it means the UE needs to perform a file repair procedure or session. The UE may notify the BM-SC of the future incoming file repair before the file repair window starts. The BM-SC may use this statistic data to determine how to prevent repair storm (either prolong the file repair period or cancel the file repair procedure or session). This is very useful and it especially helps the operator or BM-SC to prevent potential unicast storm overloading the network for large file delivery e.g. Android update.

BRIEF DESCRIPTION OF THE DRAWINGS

Embodiments will now be described in more detail in relation to the accompanying drawings, in which.

DETAILED DESCRIPTION

Figure 1:
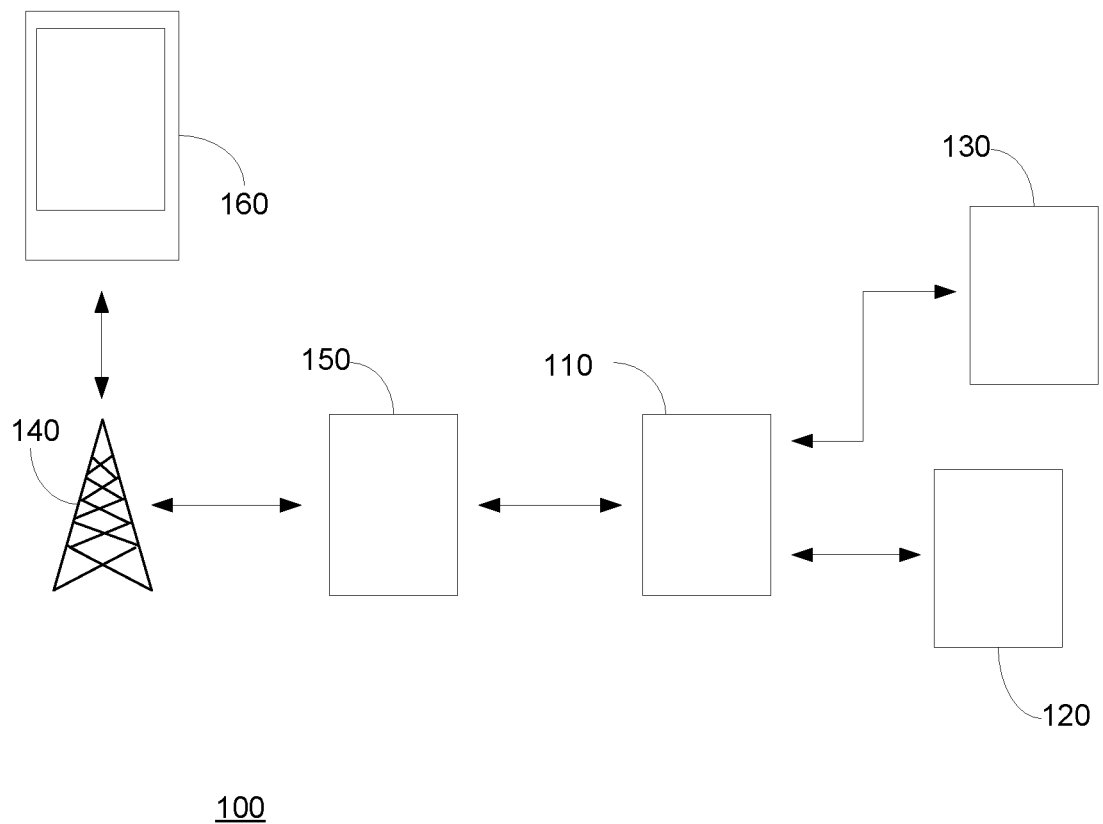
FIG. 1 is a system architecture of an MBMS enabled network, according to the prior art.

Briefly described, a BM-SC, a UE and respective methods therein are provided for transmission of a data file or data files from the BM-SC to the UE, wherein a FEC redundancy level being used for broadcasting the data file is indicated to the receiving UE.

More specifically, an object of this disclosure is to describe a BM-SC and a method executable therein for transmitting data files by way of a broadcast session to UEs, in a radio communication network, wherein a FEC redundancy level is determined on the network side of the radio communication network for the transmission or session and indicated to the UE(s). Another object is to provide a UE and a method executable therein for receiving a broadcast session as described above from the network, wherein the FEC redundancy level applicable for the transmission or session is indicated to the UE. By providing the FEC redundancy level information to the UEs, the UEs will be provided with information which, at an early stage, can be used for making decisions on how to proceed with an initiated session, thereby providing for a more efficient use of the network resources.

Once a BM-SC has determined to transmit a data file by means of broadcasting the BM-SC determines a FEC redundancy level to use for the transmission. FEC enables a receiver of data to correct any possible faults in the received data. In general, when transmitting data over the air, the quality of the transmission channel may vary quite much and a poor channel quality may result in several pieces (bits or symbols) of the data being lost. By employing FEC, additional bits or symbols are added, by the transmitting entity, to the data that is sent. The added symbols are chosen such that a receiver of the data will be able to use the added bits or symbols to recover bits or symbols of the data that were lost in the transmission.

The FEC redundancy level indicates the "strength" of the FEC that is used. If the FEC redundancy level is low, then a receiver may only be able to recover a few bits or symbols. Hence a low FEC redundancy level is typically used when the transmission channel is of good quality, meaning that the data may be transmitted to the receiver with relatively few bits being lost. Likewise, if the redundancy level is high, then a receiver may be able to recover relatively many bits or symbols. Hence a high FEC redundancy level is typically used when the transmission channel is of poor quality, meaning that the data transmitted to the receiver may suffer relatively many bits or symbols being lost.

The higher the FEC redundancy level, the more resources are required to transmit the data. The FEC in general adds data or information to the data to be sent. The added data is what the receiver uses to recover any lost bits or symbols. The higher the FEC redundancy level, the more data is added to the data to be sent. Hence, it is not desirable to use too high a FEC redundancy level as it will cost additional resources to transfer to data to the receiver. The FEC redundancy level is in general expressed in percent, e.g. 10%, 20% or 35%. The percentage is how much extra information in relation to the data to be transmitted that is added. If BM-SC plans to deliver 1 megabytes data and use 10% FEC redundancy level, it means BM-SC needs to deliver 1.1 megabytes to end user. The FEC redundancy level can be seen as the maximum percentage packet loss which the BM-SC is capable of handling, and thus, if the packet loss of a data session is found to exceed the FEC redundancy level at a UE, steps, in addition to FEC, need to be taken to cope with such a level of packet loss.

The method also comprises transmitting, to the at least one UE, the data file using the determined FEC redundancy level and an indication of the determined FEC redundancy level. The BM-SC transmits an indication of the determined FEC redundancy level to the UE(s). This means that the receiving UE(s) will both receive the data file comprising the FEC redundancy level, and an indication of the FEC redundancy level. This enables the UE(s) to individually determine, at an early stage of the broadcast procedure, a packet or symbol loss rate. The UE(s) may then notify to BM-SC about a current situation with regards to packet or symbol loss rate as will be described in more detail below.

Table 1 Below provides an example of a suggested FDT schema update in 3GPP TS 26.346 where a new attribute, here referred to as FEC-OTI-Redundancy level, where OTI is short for Object Transmission information, has been defined. The FEC redundancy level indication, or information, may be comprised at an FDT instance level, or file attribute level. This attribute may be included if FEC encoding is enabled, wherein the value of the attribute is given as a percentage representing an overhead caused by the FEC. The FEC-OTI-Redundancy level may alternatively be referred to as FEC redundancy level or FEC overhead.

TABLE 1

```
<?xml version="1.0" encoding="UTF-8"?>
    <xs:schema
        xmlns="urn:IETF:metadata:2005:FLUTE:FDT"
        xmlns:xs="http://www.w3.org/2001/XMLSchema"
        targetNamespace="urn:IETF:metadata:2005:FLUTE:FDT"
        elementFormDefault="qualified">
        <xs:element name="FDT-Instance" type="FDT-InstanceType"/>
        <xs:complexType name="FDT-InstanceType">
            <xs:sequence>
                <xs:element name="File" type="FileType" maxOccurs="unbounded"/>
                <xs:any namespace="##other" processContents="skip" minOccurs="0"
maxOccurs="unbounded"/>
            </xs:sequence>
            <xs:attribute name="Expires" type="xs:string" use="required"/>
            <xs:attribute name="Complete" type="xs:boolean" use="optional"/>
            <xs:attribute name="Content-Type" type="xs:string" use="optional"/>
        <xs:attribute name="Content-Encoding" type="xs:string" use="optional"/>
            <xs:attribute name="FEC-OTI-FEC-Encoding-ID" type="xs:unsignedLong"
use="optional"/>
            <xs:attribute name="FEC-OTI-FEC-Instance-ID" type="xs:unsignedLong"
use="optional"/>
                <xs:attribute name="FEC-OTI-Maximum-Source-Block-Length" type="xs:unsignedLong"
                    use="optional"/>
                <xs:attribute name="FEC-OTI-Encoding-Symbol-Length" type="xs:unsignedLong"
use="optional"/>
                <xs:attribute name="FEC-OTI-Max-Number-of-Encoding-Symbols"
type="xs:unsignedLong"
                    use="optional"/>
                <xs:attribute name="FEC-OTI-Redundancy-Level"
type="xs:unsignedLong"
                    use="optional"/>
                <xs:attribute name="FEC-OTI-Scheme-Specific-Info" type="xs:base64Binary"
use="optional"/>
            <xs:anyAttribute processContents="skip"/>
        </xs:complexType>
        <xs:complexType name="FileType">
            <xs:sequence>
                <xs:any namespace="##other" processContents="skip" minOccurs="0"
maxOccurs="unbounded"/>
            </xs:sequence>
            <xs:attribute name="Content-Location" type="xs:anyURI" use="required"/>
            <xs:attribute name="TOI" type="xs:positiveInteger" use="required"/>
            <xs:attribute name="Content-Length" type="xs:unsignedLong" use="optional"/>
            <xs:attribute name="Transfer-Length" type="xs:unsignedLong" use="optional"/>
            <xs:attribute name="Content-Type" type="xs:string" use="optional"/>
            <xs:attribute name="Content-Encoding" type="xs:string" use="optional"/>
            <xs:attribute name="Content-MD5" type="xs:base64Binary" use="optional"/>
            <xs:attribute name="FEC-OTI-FEC-Encoding-ID" type="xs:unsignedLong"
use="optional"/>
            <xs:attribute name="FEC-OTI-FEC-Instance-ID" type="xs:unsignedLong"
use="optional"/>
                <xs:attribute name="FEC-OTI-Maximum-Source-Block-Length" type="xs:unsignedLong"
                    use="optional"/>
                <xs:attribute name="FEC-OTI-Encoding-Symbol-Length" type="xs:unsignedLong"
use="optional"/>
                <xs:attribute name="FEC-OTI-Max-Number-of-Encoding-Symbols"
type="xs:unsignedLong"
                    use="optional"/>
            <xs:attribute name="FEC-OTI-Redundancy level" type="xs:unsignedLong"
```

TABLE 1-continued

```
            use="optional"/>
        <xs:attribute name="FEC-OTI-Scheme-Specific-Info" type="xs:base64Binary"
  use="optional"/>
        <xs:anyAttribute processContents="skip"/>
        </xs:complexType>
</xs:schema>
```

If the UE knows the FEC-OTI redundancy level, from herein after, simply referred to as FEC redundancy level, of the incoming data file object from the beginning, it will be able to take different and better actions, if the UE experience packet loss during the transmission of the data file, and more specifically, already at a point in time when packet loss percentage is found to exceed the FEC redundancy level, or in other words, in contrast to keep receiving packets which the UE cannot recover, the UE can, thus discard packets belonging to a respective file object from this point in time. By choosing not to continue to receive packets, the UE cannot continue processing and, as a consequence, it will stop processing at an early stage, which will save battery and may also give a better user friendliness.

Figure 3:
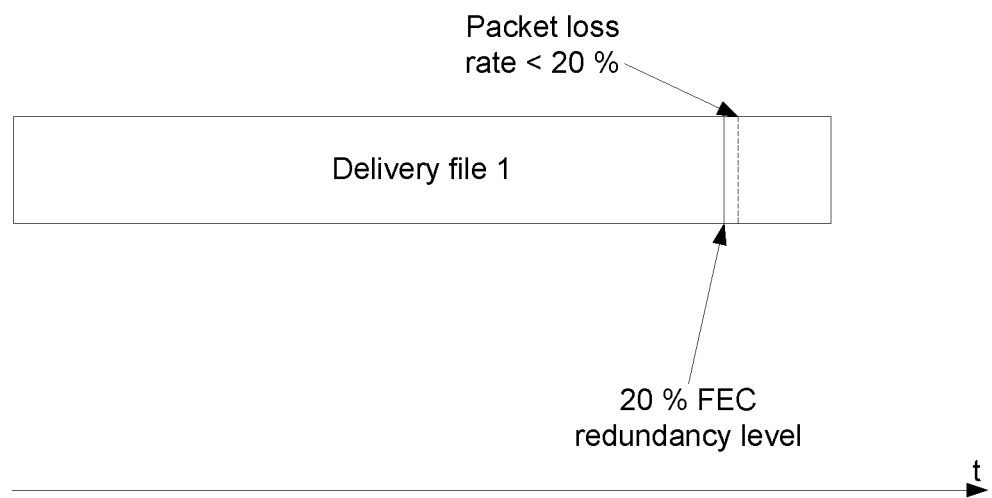
FIG. 3 is schematic illustration of a transmitted delivery file, which is affected by a packet loss rate not exceeding an applied FEC redundancy level.
Figure 2:
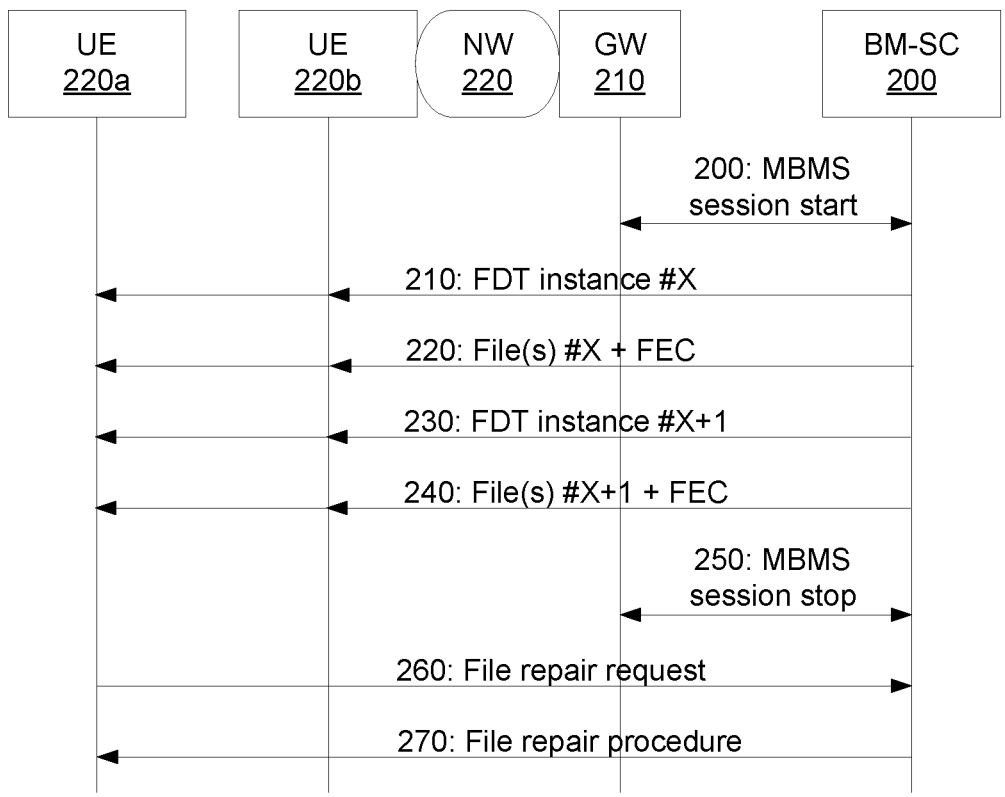
FIG. 2 is a signalling scheme illustrating a typical MBMS download session between a BM-SC and two UEs, according to the prior art.

FIG. 3 is exemplifying a delivery file, comprising a FEC redundancy level exceeding 20%, i.e. a packet loss rate which does not exceed 20% will be handled by the UE, while in case the packet loss rate exceeds 20%, actions, such as one of the ones suggested above will be initiated.

More specifically, The UE may discard the session, i.e. the broadcast transmission of the data file, if the packets loss is found to exceed the FEC redundancy level, or the UE can report the packet loss rate to the BM-SC before the broadcast transmission session finishes.

From the operators perspective, or BM-SC, different actions can be taken at the BM-SC to prevent what could be referred to as traffic blood, or, expressed in other words, overload of the network, before file repair back-off mode opens if the UEs report potential file repair requirements at an early stage, as suggested above.

Figure 4:
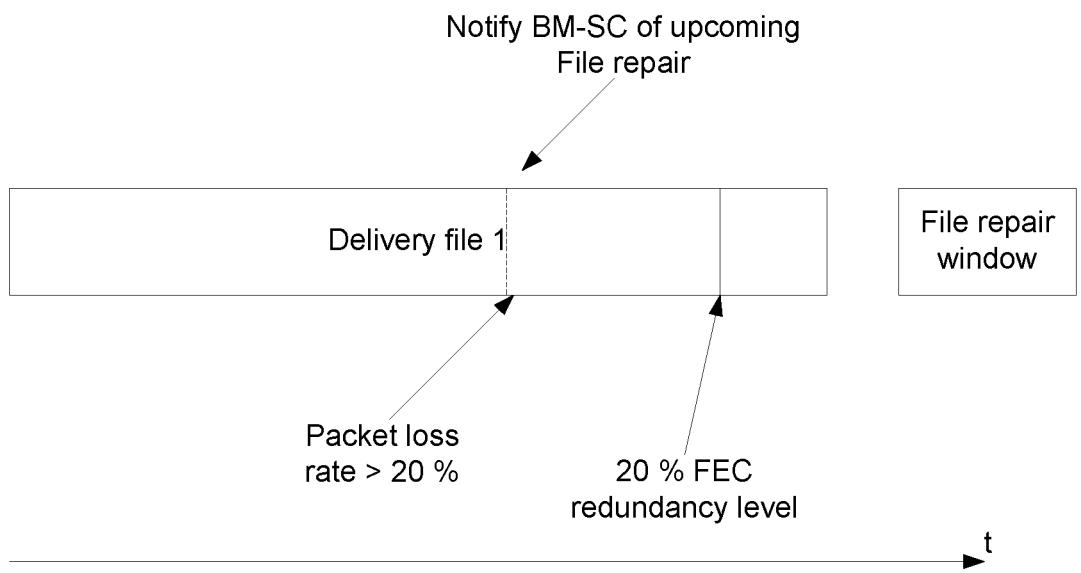
FIG. 4 is schematic illustration of a transmitted delivery file, which is affected by a packet loss rate exceeding an applied FEC redundancy level.

If the MBMS download session enables file repair for on-request content delivery, the operator will be able to control the functionality of the BM-SC in the following way. From the operators perspective, the BM-SC become aware of a potential file repair request amount before the actual file repair process start, after which different actions may be taken at the BM-SC. One such action may be to prolong the repair window, another to cancel the P2P data file repair by announcing another empty associate delivery procedure (ADP), or to update the schedule fragment, which means that the BM-SC will enforce the UE to cancel the ADP procedure before the file repair window starts. The BM-SC may schedule another broadcast service for the download session if there are many UEs that failed to recover the data file object. This may be exemplified with FIG. 4. Thanks to that the UE is aware of the FEC redundancy level already at the beginning of the reception and can statistically determine the packet loss rate and compare it to the FEC redundancy level it will be able to react to a packet loss rate exceeding the FEC redundancy level 20%, by notifying the BM-SC that a file repair process will be required for the UE after the expiry of the FDT instance, i.e. once the broadcast session for downloading of data files terminates.

All the client request information may be collected to check how many users, i.e. the number of UEs, which need file repair for the ongoing download session. Depending on the statistic before the file repair window is reached, different actions may be taken at the BM-SC:

(1) If the amount of file repair requests will not over flood the network, but the predefined repair window is found to be too short; the ADPD xml may be updated and transmitted either in-band or out-band (unicast or broadcast) to extend the file repair window.

(2) If the amount of file repair requests may over flood the network and the file repair server(s), the file repair procedure or session may be cancelled by transmitting updated user service description (USD) fragments in-band. If needed another time slot can be scheduled to resend the data file(s) in the same broadcast session or schedule another broadcast session instead of using the file repair mechanism.

The above described BC-SC and the method therein, as well as the above described UE and the method therein may have several advantages. One advantage is to enable the FEC redundancy level information to be delivered to a UE thereby enabling the UE to determine how many packets are being successfully received of the data file from the BM-SC and how many packets are not successfully received and to evaluate this result to take appropriate actions. The UE may thereby trigger early action as soon as the packet loss is found to exceed the FEC redundancy level and before the FDT instance expires.

(A) For dash streaming, if the FEC redundancy level information is included, the UE can make a quick decision to drop a total segment if the packet loss for this segment already exceed the FEC redundancy level, thereby enabling the UE to take an early action if the segment cannot be recovered. Otherwise the UE must wait until the FDT instance expire time is reached, before any action can be taken.

(B) For on-request content, whenever the UE's packet loss rate exceeds the FEC redundancy level, it means the UE needs to perform a file repair procedure or session. The may notify the BM-SC of the future incoming file repair before the file repair window starts. The BM-SC may use this statistics data to determine how to prevent repair storm by either prolong the file repair period or by cancelling the file repair procedure or session. This is very useful and it especially prevents potential unicast storm overloading of the network for large file delivery such as e.g. deliveries due to Android updates.

FIGS. 5 and 6a-6d are flowcharts of examples of methods in a BM-SC for transmitting data of a data file by applying a broadcast session to at least one UE in a radio communication system.

Figure 5:
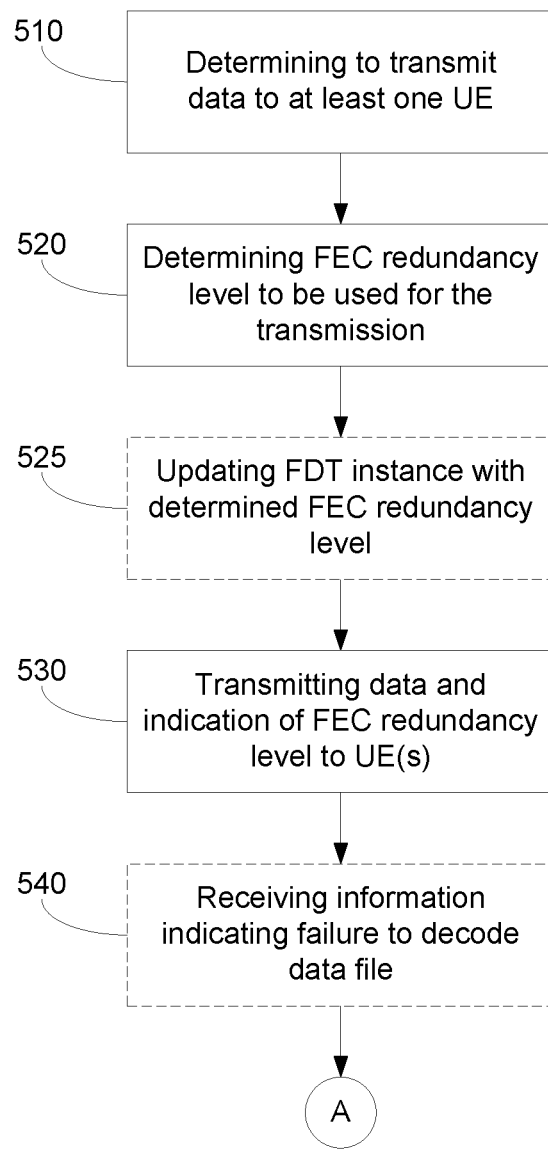
FIG. 5 is a flow chart illustrating a method executed at a BM-SC, for determining a FEC redundancy level and providing it to UEs.

In an example, the method of FIG. 5, executable in a BM-SC, for transmitting a data file by broadcast session to at least one UE in a radio communication system comprises determining in step 510 to transmit the data file to the at least one UE. This decision may be triggered by e.g. receiving the data file from a network node with instructions that the data file is to be sent to a plurality of UEs, which may also be referred to as MBMS clients.

Once the BM-SC has determined to transmit the data file, by means of broadcasting, the BM-SC determines a FEC redundancy level to use when transmitting the data file, as indicated in another step 520. FEC enables a receiver of data to correct any possible faults in the received data. In general, when transmitting data over the air, the quality of the transmission channel may vary quite much and a poor channel quality may result in several pieces (bits or symbols) of the data being lost. By employing FEC, additional bits or symbols are added, by the transmitting entity, to the data that is sent. The added symbols are chosen such that a receiver of the data may use the added bits or symbols to recover bits or symbols of the data that were lost in the transmission.

The method also comprises transmitting, to the at least one UE, the data file using the determined FEC redundancy level and an indication of the determined FEC redundancy level, as indicated in another step 530.

According to one alternative embodiment, the method described above may further comprise updating of a (File Delivery Table) FDT instance with the determined FEC redundancy level, as indicated with optional step 525, wherein the updated FEC redundancy level is transmitted to the UE(s) in the FDT instance.

Before the BM-SC starts transmitting or broadcasting data packets out to the UE(s) or eMBMS client(s), the BM-SC sends out user service description including necessary information. During the broadcasting session, the BM-SC also sends out FDT instance to describe the delivered or broadcasted file objects. The UE(s) or eMBMS client(s) can use FDT instance to decode the received data packets and recover the file object. By updating the FDT instance with the determined FEC redundancy level, the BM-SC enables this information to be sent out to the UE(s) receiving the broadcasted data file.

In an example, the data to be transmitted to the at least one UE is associated with the FDT instance, wherein the data file is partitioned into packets, each packet being associated with the FDT instance.

The FLUTE FDT instance describes the delivered or broadcasted file objects and also provides information, to the UE(s) about the data file partitioning. Typically, the data file may be very large and must be partitioned into packets, or symbols. In this example, each packet of the data file to be transmitted is associated with the FDT instance.

Alternatively, the method of FIG. 5 may also comprise another optional step 540, receiving information from at least one UE of the at least one UE indicating to the BM-SC that the UE could not successfully decode the data file when applying the FEC redundancy level used for transmitting the data file, the information also indicates a packet loss rate.

According to an embodiment, receiving the information from at least one UE of the at least one UE, indicating to the BM-SC that the UE could not successfully decode the data file, comprises receiving a Reception Report Request indicating the packet loss rate to the BM-SC.

In this manner, an existing message is used to convey the information about the failure of the UE to successfully receive and decode the broadcasted packet and to convey the information about the packet loss rate to the BM-SC.

The UE(s) uses FDT instance to decode the received FLUTE object packets/symbols and recover the file object. The UE(s) make use of the enclosed FEC redundancy level to decode a received packet or symbol. As will be explained below, in case the UE is unable to successfully decode the packet, the UE informs the BM-SC about the failure to successfully decode the broadcasted packet. The UE also indicates, to the BM-SC, a packet/symbol loss rate.

In case information indicating failure to decode data file, according to step 540 is received at the BM-SC the BM-SC may continue the method in a number of alternative ways, which may depend on the present circumstances and/or chosen configuration, as will now be described in FIGS. 6a-6d.

Figure 6A:
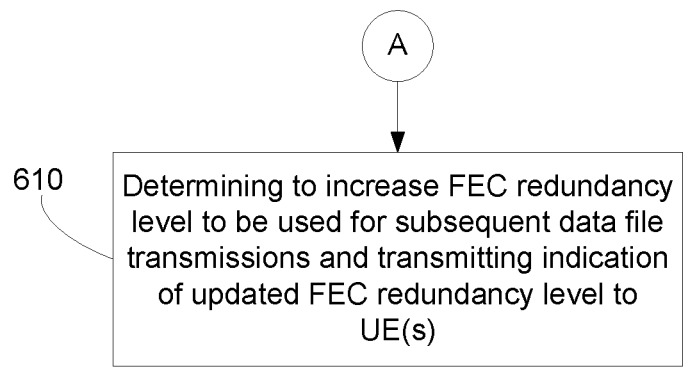
FIGS. 6a-6e are flow charts illustrating alternative ways of proceeding after having determined a FEC redundancy level at a BM-SC.

According to one embodiment, indicated as step further step 610 in FIG. 6a the BM-SC determines to increase the FEC redundancy level, and continue transmitting, to the UE, subsequent packet (s) of the data file using the increased FEC redundancy level and an indication that the increased FEC redundancy level is hereinafter used.

Since the BM-SC receives the information from at least one UE of the at least one UE indicating to the BM-SC that the UE could not successfully decode the data file, the BM-SC knows that the FEC redundancy level was too low for the UE to successfully decode the broadcasted packet of the data file. This may be due to the channel being of poor quality so that the broadcasted packet becomes somewhat corrupt, or corrupted to a level making it impossible for the UE to correct the errors in the packet using the current FEC redundancy level.

The BM-SC in this example determines to increase the FEC redundancy level, whereby the UE may be able to correct more errors in a broadcasted and received packet than using the lower, or current, FEC redundancy level. This may possibly overcome the drawbacks of broadcasted packets being unrecoverably corrupted due to e.g. a bad channel quality, since the higher the FEC redundancy level, the more errors may be corrected by the receiver.

Since the FEC redundancy level has now been changed, in this example increased, the BM-SC must indicate, to the UE(s), that the increased FEC redundancy level is hereinafter used. This may be done by again updating the FDT instance based on the present FEC redundancy.

In this manner, all UE(s) receiving the broadcast is informed of the new increased redundancy level due to the BM-SC sending out the FDT instance to describe the delivered or broadcasted file objects or packets. The UE(s) may then use FDT instance to decode the received FLUTE object packets and recover the file object. By updating the FDT instance with the increased FEC redundancy level, the BM-SC enables this information to be sent out to the UE(s) receiving the broadcasted data file. Thereby, the REC redundancy level need not be constant or static during a broadcasting session, but instead may be dynamic to meet possibly varying conditions, resulting in changes of the REC redundancy during the broadcasting session.

Figure 6B:
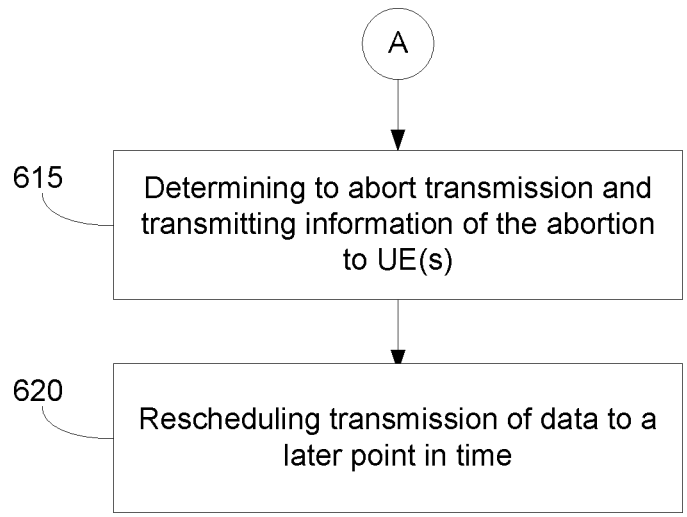

According to another embodiment, the BM-SC instead apply the steps of FIG. 6b, i.e. the BM-SC determines to abort the transmission of the data file to the at least one UE, and to transmit information to the at least one UE that the transmission of data has been aborted, as indicated with step 615 and to reschedule the transmission of data to a later point in time, as indicated with another step 620.

The BM-SC may reschedule the transmission of data to a later point in time. Since the channel quality in a radio or wireless communication system may vary quite substantially over time, the BM-SC may assume that the reason for the UE(s) reporting failure to decode the broadcasted packets is due to a temporarily deterioration of the channel quality. Hence, at a later point in time, the channel quality may have improved, and therefore the BM-SC reschedules the transmission of data to a later point in time.

The BM-SC may receive a relatively high number of indications from different UEs informing the BM-SC that the UEs are not able to successfully decode the broadcasted packets from the BM-SC. The BM-SC may, in this example, determine to abort the transmission of the data file to the at least one UE. This is an alternative to increasing the FEC redundancy level.

Once the BM-SC determines to abort the transmission of the data file to the at least one UE, the BM-SC informs the at least one UE about the abortion of the transmission of data. In this way, the UE(s) may become aware that they should, or need, not listen for more packets to be received by the broadcast session. The UE(s) may then take appropriate actions, e.g. simply discard all the so far received packets of the data file, or request a transmission of the data file.

The rules of how to choose the right alternative can be predefined by the operator. For instance, if there are 1000 potential file repair requests for one sessions, the operator may prolong the file repair window; if there are 10,000 potential file repair requests, the operator can choose to cancel the file repair for the delivery session.

Figure 6C:
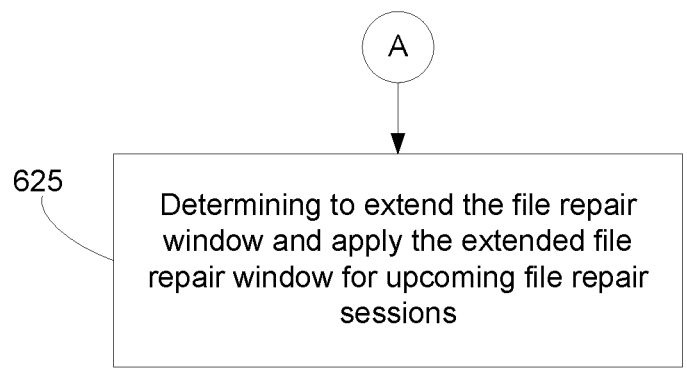

According to yet another embodiment, the BM-SC may instead, as indicated in FIG. 6c, determine to extend the file repair window and applying the extended file repair window for any file repair session following the termination of the ongoing transmission of the data file. This alternative is indicated as step 625 in FIG. 6c.

The BM-SC receives the indications from a plurality of UEs indicating failure to successfully decode the broadcasted packets of the data file. As yet an alternative to increase the FEC redundancy level or aborting transmission of the data file, the BM-SC may determine to extend a file repair window following the termination of transmission of data to the at least one UE. This means that the UEs are enabled to use the file repair procedure during a longer time than a default time for a file repair procedure. The BM-SC may consider the number of UEs that will request file repair, since this is known from the received indication of failure to successfully decode broadcasted packets. If the number of individual file repair sessions, i.e. the number of UEs being involved in file repair procedure, will not overload the network, and if the current file repair window is too short to allow all UEs performing file repair, the BM-SC may update the ADPD xml in order to extend the file repair window. When the BM-SC updates the ADPD xml, the BM-SC unicasts or broadcasts the updated ADPD xml in order to extend the file repair window.

Figure 6D:
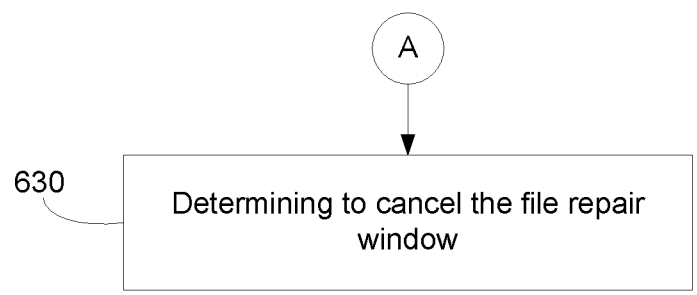

According to yet another embodiment, indicated with step 630 of FIG. 6d the BM-SC may instead determine to cancel the file repair window which should follow the termination of transmission of data to the at least one UE.

The BM-SC may receive a relative large number of indications from the UEs indicating failure to successfully decode broadcasted packets. In case of a large number of such indications, the BM-SC may assume that a file repair procedure may overload the network. In order to avoid any overload situation, the BM-SC instead determines to cancel the file repair window. This may result in several UEs not being able to successfully receive the complete data file.

The operator may cancel the rile repair window by sending updated user service fragments through a service discovery channel.

Figures 6E, 7A:
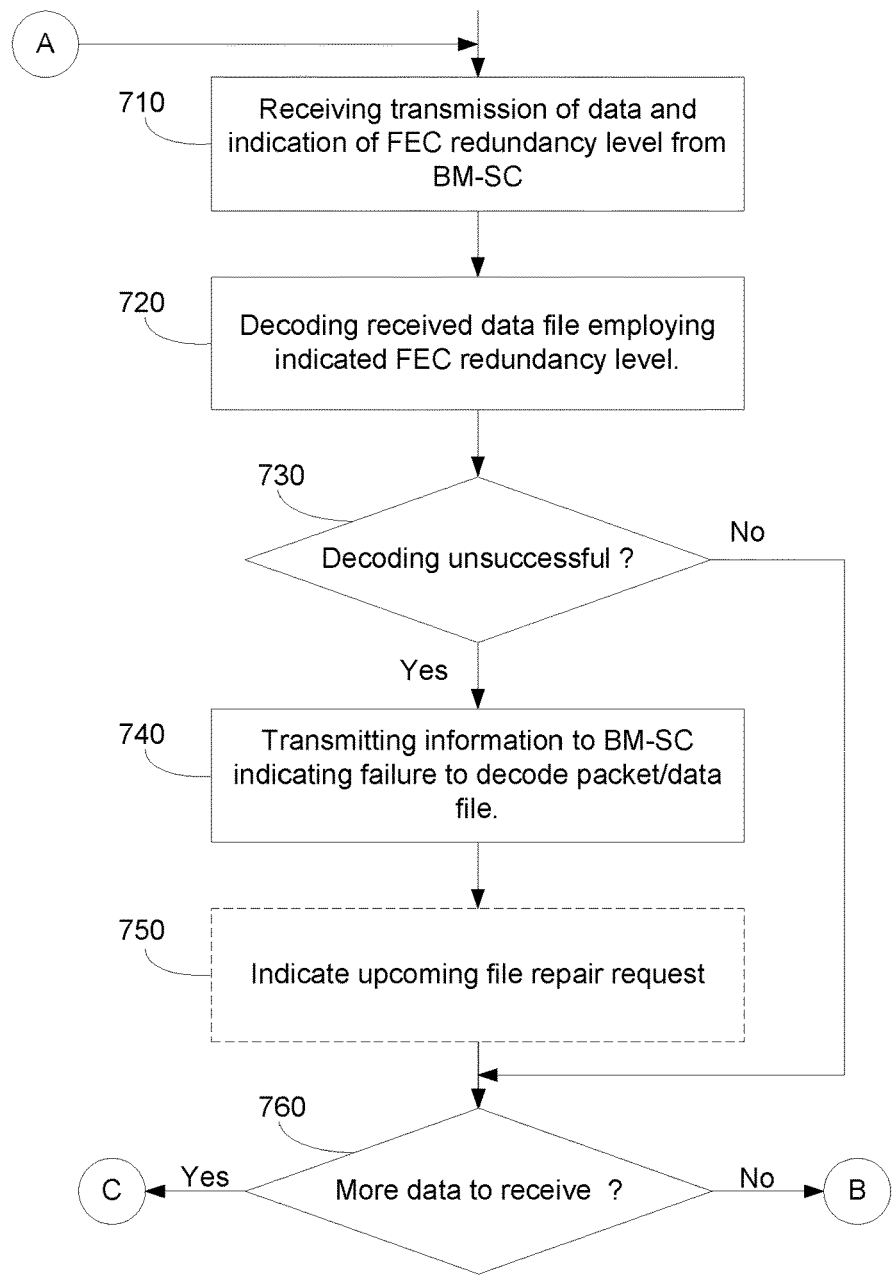
FIGS. 7a and 7b are flow charts illustrating how a UE can receive and use FEC redundancy level information, received from a BM-SC.

According to yet another embodiment the BM-SC may instead, as indicated in step 630 of FIG. 6e, save information about the number UEs that have reported failure to successfully decode the data file and a packet loss percentage for the UE(s) of the at least one UE intended to receive the data file, and based on this saved information, retransmit a certain percentage of the repair symbols after the termination of transmission of data to the at least one UE. Alternatively another time slot in the broadcast session may be used to retransmit the file.

In this example, the BM-SC may also cancel the file repair window and instead retransmit a certain percentage of repair symbols after the termination of transmission of data to the at least one UE, or using another time slot in the broadcast session to retransmit the file. In this manner, the risk of overloading the network due to file repair requests and file repair sessions is avoided. Further, it may save resources in case the repair symbols retransmitted after the termination of transmission of data to the at least one UE, or using another time slot in the broadcast session to retransmit the file, may enable the UE(s) to recover the data file without making use of the file repair procedure.

The eMBMS download session enables file repair for on-request content delivery. If the operator or BM-SC may know the potential file repair request amount before the really file repair start, the operator or BM-SC may take different actions, e.g. either prolonging the repair window or cancelling the Point-to-Point, P2P, data file repair by announcing another empty associate delivery procedure, ADPD, or updating the schedule fragment which means the operator or BM-SC want the UE or eMBMS client to cancel the ADPD procedure before the file repair window start. The operator or BM-SC may schedule another broadcast service for the download session if there are so many end users that failed to recover the data file object.

Figure 7B:
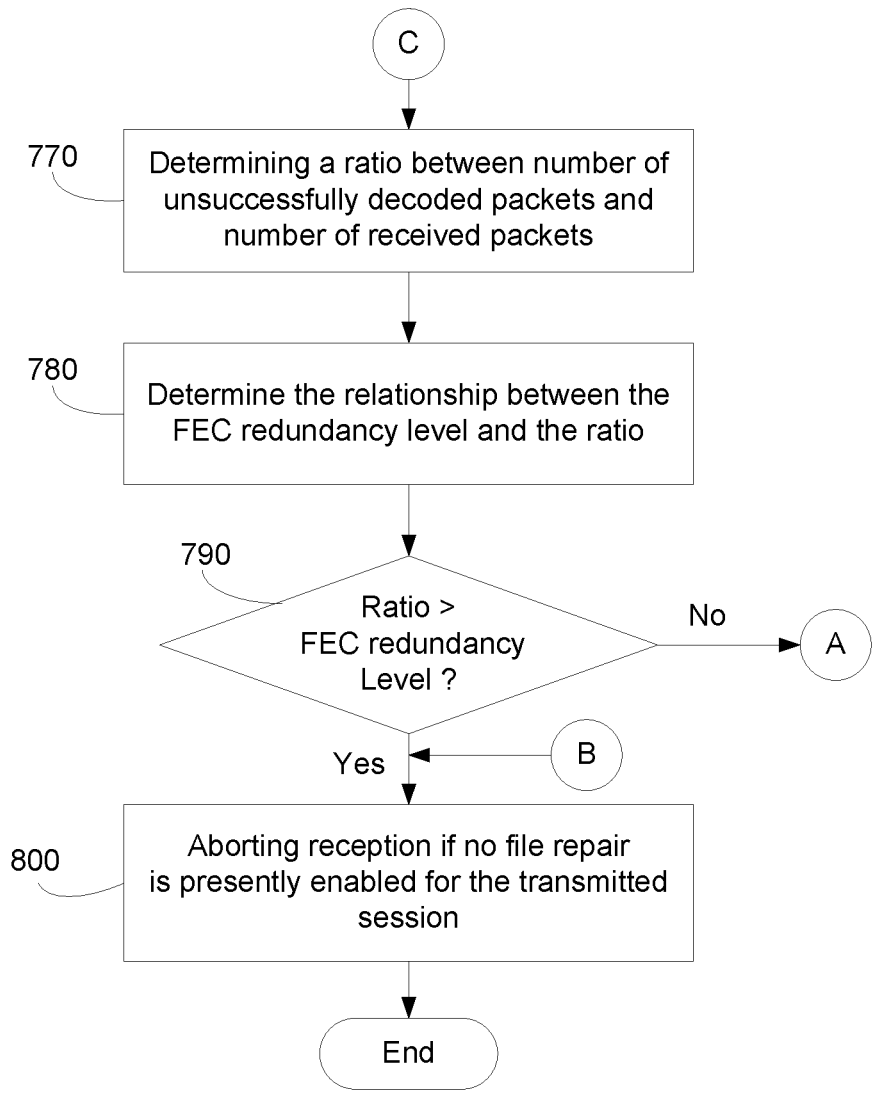

FIGS. 7a and 7b are flowcharts illustrating examples of methods executable in a UE which is capable of receiving a broadcast session of transmission of a data file from a BM-SC.

According to one embodiment, which is described with reference to FIG. 7a the UE is receiving a transmission from the BM-SC comprising a data file and an indication of a FEC redundancy level used for transmitting the data, as indicated with step 710, the FEC redundancy level resulting in an overhead added to the data which is received, and decoding the received transmission, employing the indicated FEC redundancy level, as indicated with step 720.

The UE receives a transmission from the BM-SC comprising the data file and an indication of a FEC redundancy level used to transmit the data. This means that the UE receives both the broadcast transmission of the data file, in the form of at least one packet. The UE also receives an indication of a FEC redundancy level used to transmit the data. The UE may then use the FEC redundancy level in order to successfully decode the received packets or data file. In case the received packets or data file comprises an error ratio lower than the FEC redundancy level, the UE is able to correct the faults in the packets or data file to successfully decode the packets or data file.

The method in the UE may have several advantages. One advantage is that the FEC redundancy level information is delivered to the UE and enables the UE to determine how many packets are being successfully received of the data file from the BM-SC and how many packets are not successfully received. The UE may trigger early action as soon as the packet loss exceeds the FEC redundancy level and before the FDT instance expires. (a) For dash streaming, if the FEC redundancy level information is included, the UE can make a quick decision: drop the total segment if the packet loss for this segment already exceed the FEC redundancy level. Enable the UE to take early action if the segment cannot be recovered. Otherwise the UE must wait until the FDT instance expire time is reached before any action may be taken. (b) For on-request content, whenever the UE's packet loss rate exceeds the FEC redundancy level, it means the UE needs to perform a file repair procedure or session. The UE may notify the BM-SC of the future incoming file repair before the file repair window starts. The BM-SC may use this statistic data to determine how to prevent repair storm (either prolong the file repair period or cancel the file repair procedure or session). This is very useful and it especially helps the operator or BM-SC to prevent potential unicast storm overloading the network for large file delivery e.g. Android update.

According to an embodiment, the data file is associated with a FDT instance, wherein the data file is partitioned into packets, each packet being associated with the FDT instance, wherein the FDT instance comprises FEC redundancy level information.

Before the BM-SC starts transmitting or broadcasting FLUTE packets out to the UE(s) or eMBMS client(s), the BM-SC sends out user service description including necessary information. During the broadcasting session, the BM-SC also sends out FDT instance to describe the delivered or broadcasted file objects. The UE(s) or eMBMS client(s) can use FDT instance to decode the received FLUTE object packets and recover the file object. By updating the FDT instance with the determined FEC redundancy level, the BM-SC enables this information to be sent out to the UE(s) receiving the broadcasted data file.

Once the UE has received the FEC redundancy level, this information can be used to determine if the decoding was successful or not, as indicated in step 730. As was described above, the UE employs the FEC redundancy level to decode a received packet or data file.

If, in step 730, it is determined that the decoding of the received transmission is unsuccessful, then information is transmitted to the BM-SC, indicating that the UE could not successfully decode the data file, or packet, as indicated in step 740. The transmitted information may comprise a Reception Report Request, indicating the packet loss rate to the BM-SC. In addition, the UE may also react to the given scenario by indicating to the BM-SC that a file repair session with the BM-SC will be requested after the termination of the broadcast session, in order to receive a retransmission of those packets which were indicated to the BM-SC as not successfully decoded. This is indicated with optional step 750.

In this manner, the BM-SC is informed that the UE will request a file repair session or procedure requested after the termination of the broadcast session. This enables the BM-SC to take appropriate actions. As described above, if relatively many out of the UEs receiving the broadcasted data file indicate that they will request file repair, the BM-SC may determine to e.g. increase the FEC level, to extend the file repair window or to cancel the file repair window.

In this manner, an existing message can be used to convey the information about the failure of the UE to successfully receive and decode the broadcasted packet and to convey the information about the packet loss rate to the BM-SC.

In case more data is received, the method may continue as indicated with branch C in FIGS. 7a and 7b, while in case no more data is received, the method continues as indicated with branch B in FIGS. 7a and 7b as indicated in step 660 and as further described below.

In addition to the method steps as described above, the UE may execute further steps, based on the knowledge of the dynamic FEC redundancy level, as will now be described with reference to FIG. 7b. According to step 770 of FIG. 7b the UE determines a ratio between the number of packets which have not been successfully decoded and the number of received packets, and in a subsequent step 780 the relationship between the FEC redundancy level, and the determined ratio is determined. The UE receives a plurality of packets all part of the same data file being broadcasted from the BM-SC to the UE(s). Some packets may be successfully decoded and some packets may not be successfully decoded. The UE determines a packet loss ratio which is expressed in percent and which is the number of unsuccessfully decoded packets divided by the total number of received packets.

If, in a next step 790 it is determined that the ratio is higher than the FEC redundancy level, i.e. the relative amount of unsuccessfully decoded packets is larger than what can be handled by applying FEC, and, thus, file repair is not enabled for the delivered data file, the UE may deduct that it will not be able to successfully receive and decode the data file. If so, it would be a waste of resources of the UE keeping on receiving more packets of the data file. Consequently, the UE then will determine to abort or terminate the ongoing reception of further packets of the same data file within the broadcast session unless file repair is enabled, as indicated in step 800. A file repair procedure is only enabled for on-request content delivery via broadcast. However, as has been explained above, the BM-SC has the option of cancelling the file repair window, thereby disabling the file repair procedure.

Figure 8:
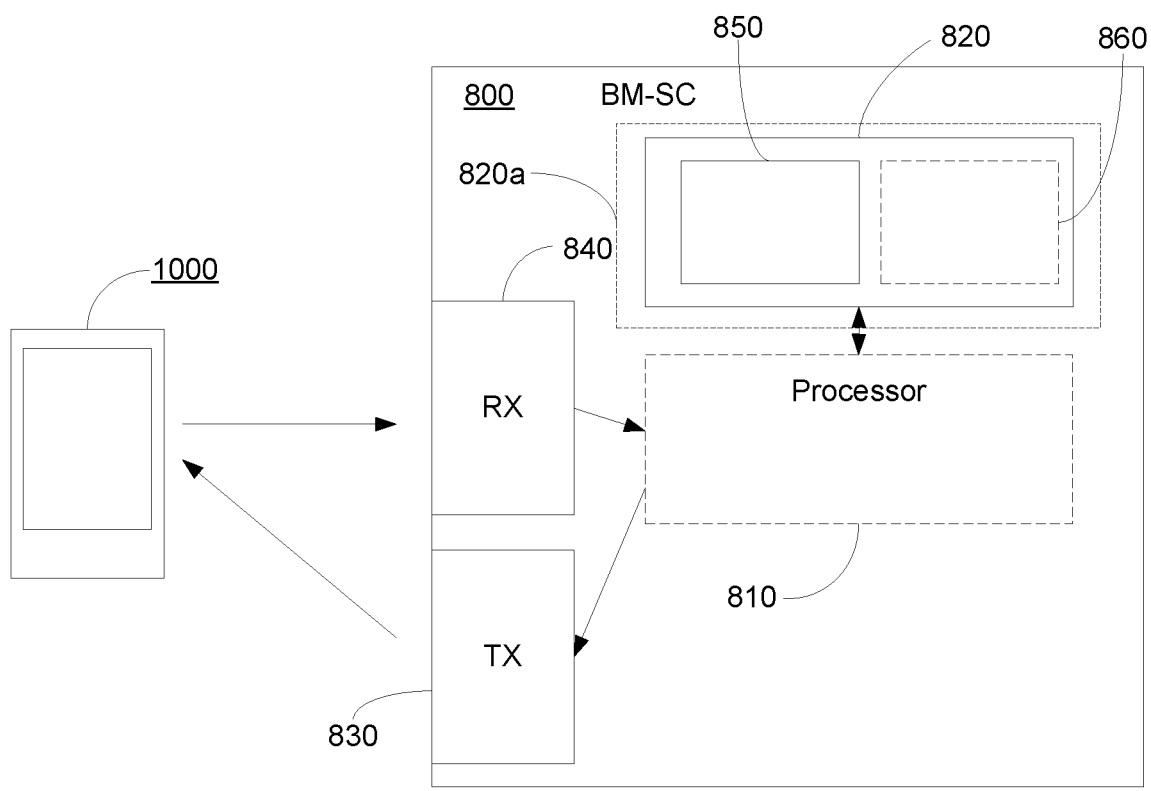
FIG. 8 is a block scheme illustrating a BM-SC capable of operating as, or in association with a BM-SC, according to a first embodiment.

A BM-SC, adapted for transmitting data via a broadcast session to at least one UE in a radio communication system, will now be described in further detail with reference to FIG. 8, where the BM-SC 800 comprises a processor 810 and a computer readable memory 820 capable of storing computer readable instructions which when executed by the processor causes the processor 810 to transmit data to the at least one UE 1000 and to determine a FEC redundancy level, which is transmitted in association with transmitting the data. In addition, computer readable instructions will also be able to cause the processor 810 to execute any of the alternative method steps suggested above, with reference to any of FIG. 5 or 6a-6e.

More specifically, the executable instructions are configured such that when executed they cause the processor 810 to determine that there is data to be transmitted to at least one UE, to determine a FEC redundancy level, indicative of the amount of FEC redundancy to be applied for the data to be transmitted, and to transmit the data and an indication of the FEC redundancy level to the one or more UEs, via a transmitting unit 830.

Further executable instructions may cause the processor 810 to insert the indication of the FEC redundancy level into an updated FDT instance, as a FEC redundancy level attribute, after which the updated FDT instance is transmitted to the one or more UEs, via the transmitting unit 830.

In addition, executable instructions may cause the processor 810 to respond to information received via a receiving unit 840, indicating failure to decode received data, from at least one of the UEs in a number of alternative ways.

According to a first embodiment executable instructions cause the processor 810 to increase the FEC redundancy level, to transmit, to the UE, an indication that the increased FEC redundancy level is hereinafter used, and continue transmitting subsequent packet (s) of the data file, using the increased FEC redundancy level.

According to a second embodiment, executable instructions instead cause the processor 810 to abort the transmission of the data file to the at least one UE 1000, and to transmit information to the at least one UE 900 that the transmission of data has been aborted.

According to a third embodiment, executable instructions instead cause the processor 810 to extend the file repair window and apply the extended file repair window for any file repair session following the termination of the ongoing transmission of the data file.

According to a fourth embodiment, executable instructions cause the processor 810 to cancel the file repair window which should follow the termination of transmission of data to the at least one UE 1000.

According to a fifth embodiment executable instructions cause the processor 810 to save information about the number of UEs that have reported failure to successfully decode the data file and a packet loss percentage for the UEs of the at least one UE 1000 intended to receive the data file, and based on this saved information, to retransmit a certain percentage of the repair symbols after the termination of transmission of data to the at least one UE 1000. Alternatively another time slot in the broadcast session may be used to retransmit the file.

Alternatively, the computer readable memory 820 may be arranged as a computer program product 820a which comprises a computer readable medium and a computer program 850 comprising the executable instructions as described above. The computer program product 820a may be in the form of a non-volatile or volatile memory, such as e.g. an Electrically Erasable Programmable Read-Only Memory (EEPROM), a flash memory, a Random Access Memory (RAM), or a disc drive, but not in the form of a signal or any form of electromagnetic wave. The computer program product 820a may also comprise persistent storage 860, which, for example, can be any single one or combination of magnetic memory, optical memory, solid state memory or even remotely mounted memory.

Figure 9:
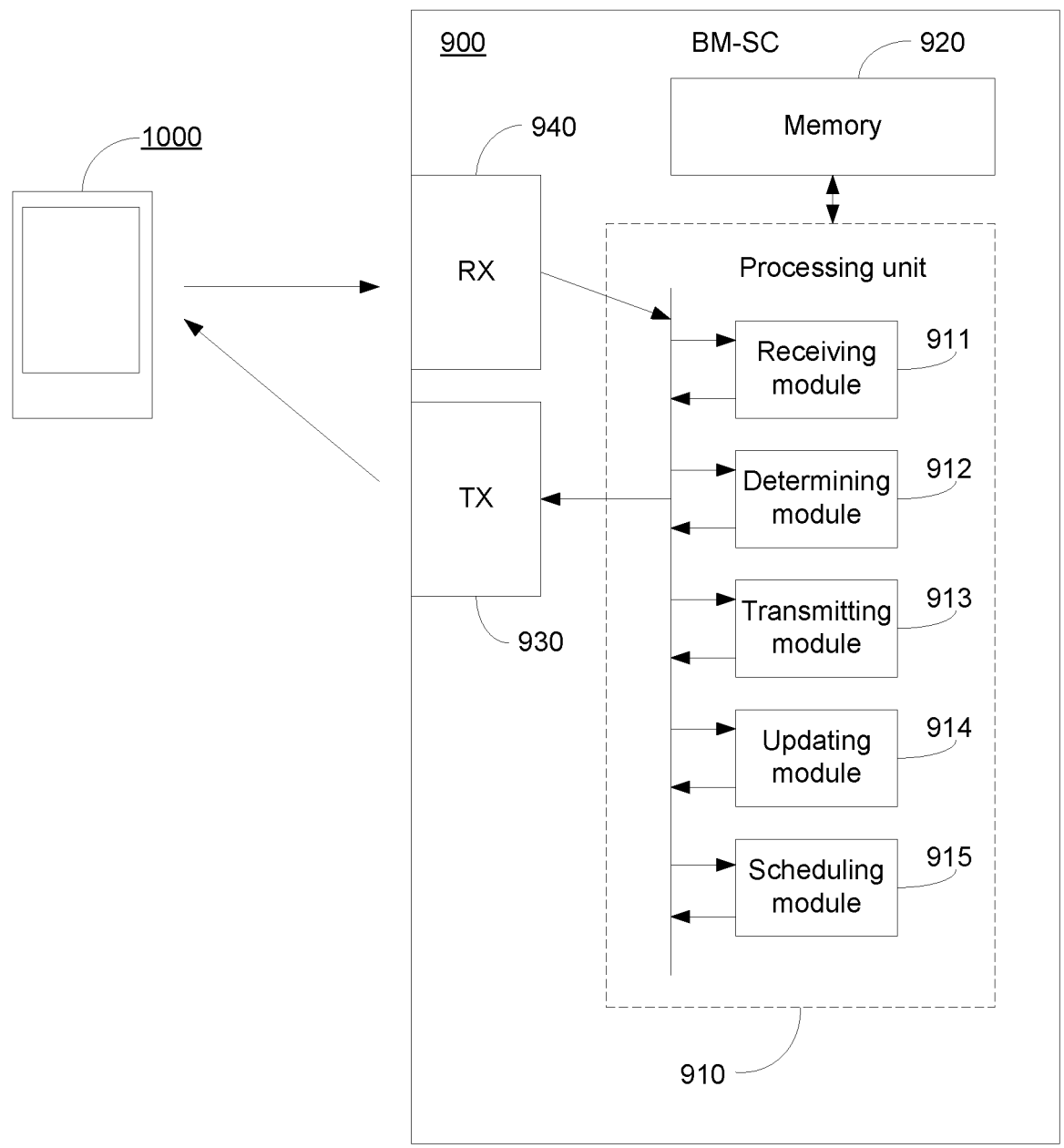
FIG. 9 is a block scheme illustrating a BM-SC according to a second embodiment.

As indicated with FIG. 9, an alternative BM-SC 900 may comprise a processing unit 910, a memory 920, a transmitting unit 930 and a receiving unit 940 operatively connected in order to be able to execute functionality which corresponds to the arrangement as described above with reference to FIG. 8. The processing unit 910 of FIG. 9 may comprise a suitable number of operatively connected modules or units, such as e.g. a receiving module 911, for receiving data from UEs, a determining module 912, for determining when to amend a FEC redundancy level, a transmitting module 913, for transmitting data to the UEs, an updating module 914, for updating a FEC redundancy level accordingly, and a scheduling module 915, for scheduling upcoming traffic, which may be affected by an updated FEC redundancy level.

Figure 10:
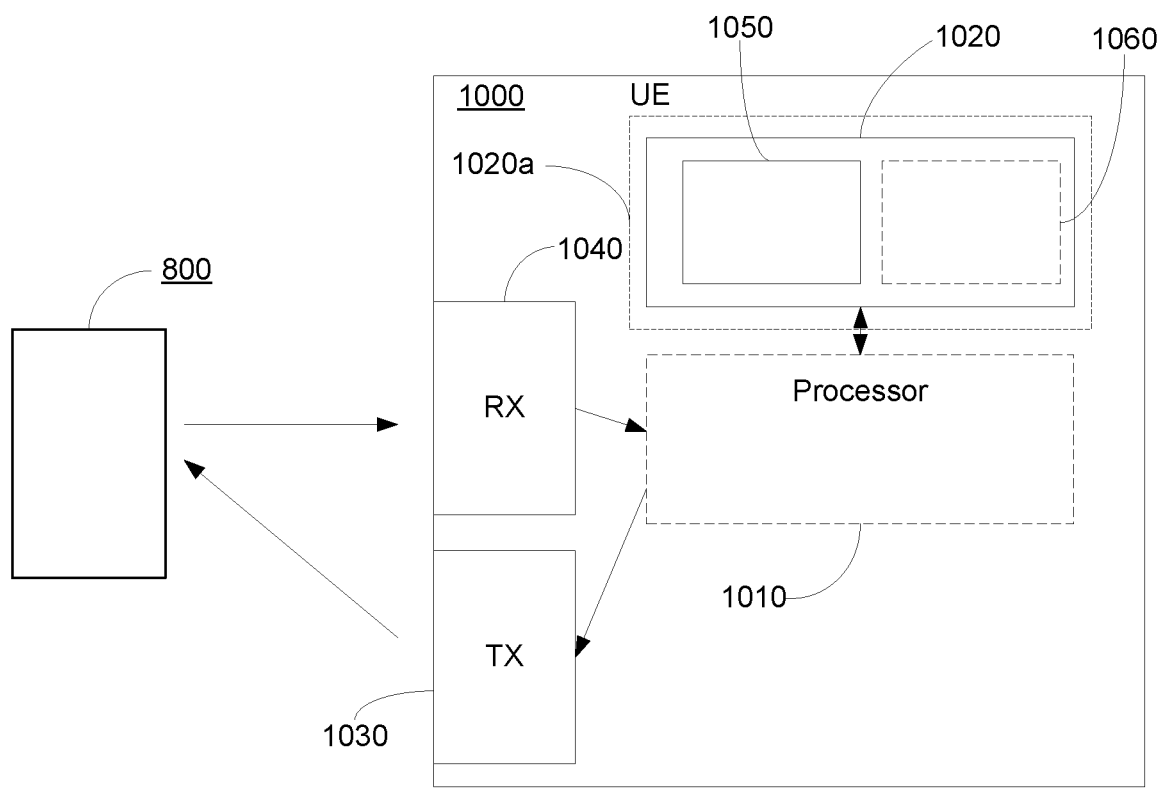
FIG. 10 is a block scheme illustrating a BM-SC capable of operating as, or in association with a UE, according to a first enbodiment.

Also a UE which is capable of executing any of the methods described above need to be adapted accordingly. According to one embodiment, a UE is adapted for receiving a broadcast session of transmission of data from a BM-SC 800, mentioned above, is described with reference to FIG. 10. The UE 1000 comprises a processor 1010 and a memory 1020 capable of storing instructions which when executed by the processor 1010 causes the processor 1010 to receive a transmission from the BM-SC 800 comprising a data file and an indication of a FEC redundancy level used to transmit the data, and to decode the received transmission, employing the indicated FEC redundancy level.

In yet an example, the data file is associated with a File Delivery Table, FDT, instance, wherein the data file is partitioned into packets, each packet being associated with the FDT instance, wherein the FDT instance comprises FEC redundancy level information.

In still an example, the memory 1020 is further capable of storing instructions which when executed by the processor 1010 causes the processor 1010 to decode the received packet or data file according to the received FEC redundancy level, wherein if the decoding of the received transmission is unsuccessful, then the processor 1010 is further adapted to transmit information to the BM-SC 800 indicating that the BM-SC 800 could not successfully decode the data file, or packet.

According to an embodiment, transmitting information to the BM-SC 800, indicating that the UE 1000 could not successfully decode the data file, or packet comprises sending a Reception Report Request, indicating the packet loss rate, to the BM-SC 800.

In another example, the memory 1020 is further capable of storing instructions which when executed by the processor 1010 causes the processor 1010 to receive a plurality of packets, to determine a ratio between the number of packets which were not successfully decoded and the number of packets which were received, to determine a relationship between the redundancy level of FEC coding and the determined ratio, and, if the ratio is higher than the FEC redundancy level, then the processor 1010 is adapted to abort the reception of further packets of the same data file within the broadcast session if the file repair is not enabled for the delivered data file.

In still an example, the memory 1020 is further capable of storing instructions which when executed by the processor 1010 causes the processor 1010 to indicate to the BM-SC 800 that a file repair session with the BM-SC will be requested after the termination of the broadcast session in order to receive a retransmission of those packets which were indicated to the BM-SC 800 as not successfully decoded.

Alternatively, the computer readable memory 1020 may be arranged as a computer program product 1020a which comprises a computer readable medium and a computer program 1000 comprising the executable instructions as described above. The computer program product 1020a may be in the form of a non-volatile or volatile memory, such as e.g. an Electrically Erasable Programmable Read-Only Memory (EEPROM), a flash memory, a Random Access Memory (RAM), or a disc drive, but not in the form of a signal or any form of electromagnetic wave. The computer program product 1020a may also comprise persistent storage 1060, which, for example, can be any single one or combination of magnetic memory, optical memory, solid state memory or even remotely mounted memory.

Figure 11:
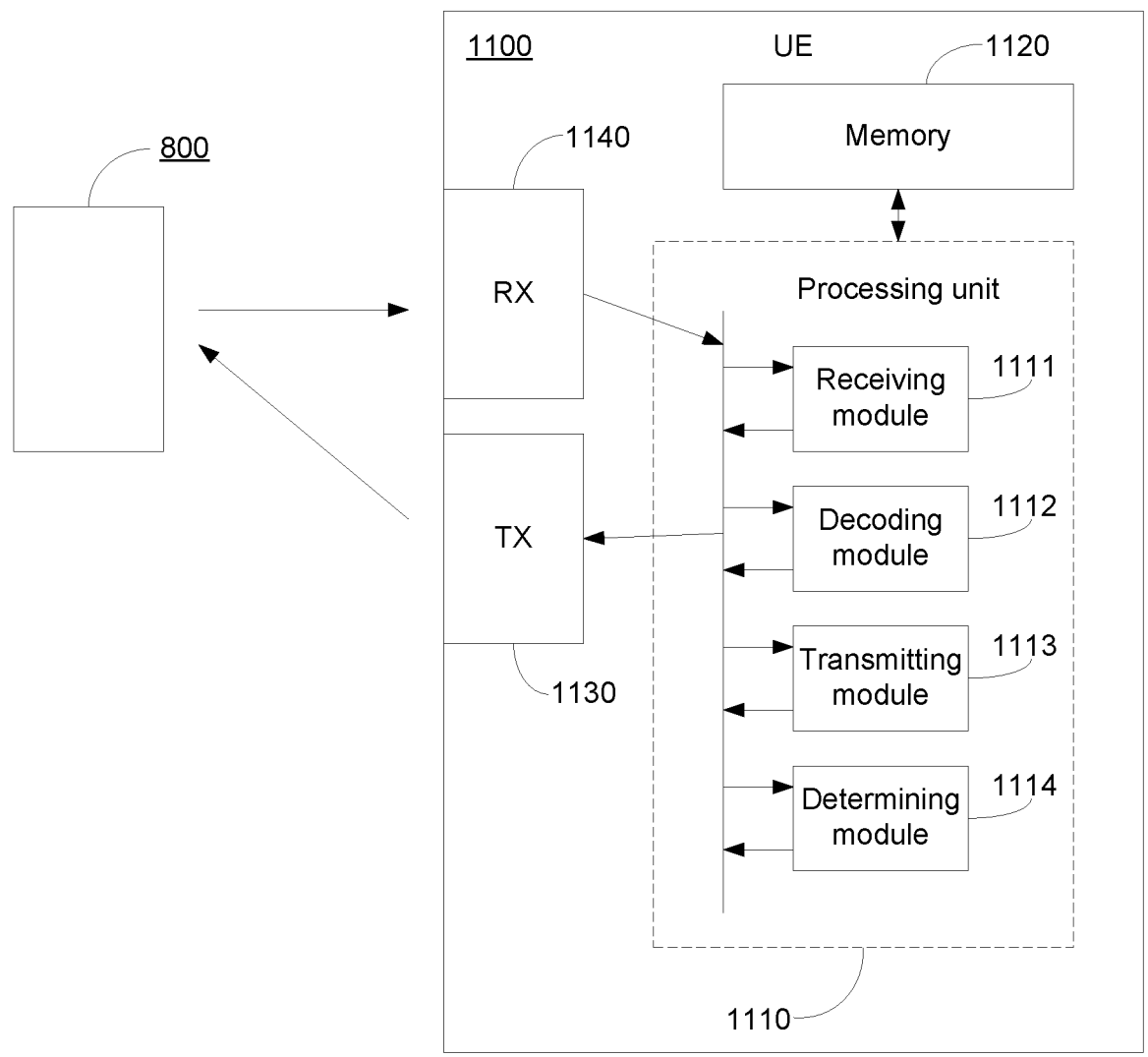
FIG. 11 is a block scheme illustrating a UE according to a second embodiment.

As indicated with FIG. 11, a UE 1100 comprising a processing unit 1110, a memory 1120, a transmitting unit 1130 and a receiving unit 1140 may instead be operatively connected to execute functionality which corresponds to the arrangement as described above with reference to FIG. 10. The processing unit 1110 of FIG. 11 may comprise a suitable number of operatively connected modules or units, such as e.g. a receiving module 1111, for receiving data from the BM-SC 900, a decoding module 1112, for decoding data received from the BM-SC 900 and for determining the quality of the decoding, a transmitting module 1113, for transmitting data to the BM-SC 900, and a determining module 1114, for executing any of the determining steps mentioned above, depending on the configuration of the UE 1100.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method executed in a Broadcast Multicast Service Centre (BM-SC) for transmitting data in a broadcast session to at least one user equipment (UE) in a radio communication system, the method comprising:
    determining to transmit data file to at least one UE;
    determining a forward error correction (FEC) redundancy level, indicative of the amount of FEC redundancy to be applied for said data file transmission;
    transmitting to said UE(s) said data file and FEC redundancy level information indicating the determined FEC redundancy level;
    receiving, from at least one of said at least one UE, information indicating failure by the at least one UE to correctly decode a packet of the transmitted data file when applying the FEC redundancy level, and a packet loss rate, indicative of the failed decoding, and
    determining based on the received information, at least one action, to be initiated for handling subsequent packet(s) of said data file, wherein
    the FEC redundancy level information comprises an integer value identifying an FEC redundancy percentage corresponding to the determined FEC redundancy level.

2. The method of claim 1, wherein the FEC redundancy level is inserted into an updated File Delivery Table (FDT) instance, as a FEC redundancy level attribute, after which the updated FDT instance is transmitted to the UE(s).

3. A method executed in a user equipment (UE) for receiving data in a broadcast session transmitted from a Broadcast Multicast Service Centre (BM-SC), the method comprising:
    receiving, from the BM-SC, transmitted data file and a FEC redundancy level applied when transmitting the data file;
    initiating decoding the received data file employing the received FEC redundancy level;
    determining failure to correctly decode a packet of the transmitted data file;
    transmitting, to the BM-SC, information indicating failure to correctly decode the transmitted data file, and a packet loss rate indicative of the failed decoding; and
    determining at least one action decisive of how to handle subsequent packet(s) of said data file to be initiated, in case it is found that the packet loss rate les-s exceeds the FEC redundancy level.

4. The method of claim 3, wherein the FEC redundancy level is provided in a File Delivery Table instance.

5. A Broadcast Multicast Service Centre (BM-SC), for transmitting data, via a broadcasting session, to at least one user equipment (UE) in a radio communication system, the BM-SC comprising:
    a processor; and
    a computer readable memory storing instructions which, when executed by the processor, cause the processor to:
    determine to transmit a data file to the at least one UE;
    determine a FEC redundancy level to use for said data file transmission, indicative of the amount of FEC redundancy to be applied for said data file data transmission;
    transmit, to the UE(s), the data file, applying the determined FEC redundancy level, and FEC redundancy level information indicating the determined FEC redundancy level;
    receive, from at least one of said at least one UE, information indicating failure by the at least one UE to correctly decode a packet of the transmitted data file when applying the FEC redundancy level, and a packet loss rate, indicative of the failed decoding; and
    determine, based on the received information, at least one action, to be initiated for handling subsequent packet(s) of said data file, wherein
    the FEC redundancy level information comprises an integer value identifying an FEC redundancy percentage corresponding to the determined FEC redundancy level.

6. The BM-SC of claim 5, wherein the processor further is adapted to update a File Delivery Table (FDT) instance with the determined FEC redundancy level.

7. The BM-SC of claim 6, wherein the memory is further capable of storing instructions which when executed by the processor causes the processor to receive information from at least one UE of the at least one UE indicating to the BM-SC that the at least one UE could not successfully decode the data file according to the FEC redundancy level applied for transmitting the data file, the information also indicating a packet loss rate.

8. The BM-SC of claim 7, wherein receiving information from at least one UE of the at least one UE indicating to the BM-SC that the at least one UE could not successfully decode the data file comprises receiving a Reception Report Request indicating the packet loss rate to the BM-SC.

9. The BM-SC of claim 6, wherein the memory further stores instructions which when executed by the processor causes the processor to perform any of:
    determine to increase the FEC redundancy level, and to continue transmitting, to the at least one UE: a subsequent packet of the data file using the increased FEC redundancy level, and an indication that the increased FEC redundancy level is to be applied from hereinafter,
    determine to abort the transmission of the data file to the at least one UE, and to transmit information to the at least one UE that the transmission of data is aborted,
    determine to extend a file repair window following the termination of transmission of the data file to the at least one UE and to apply the extended file repair window for a file repair session following the termination of the transmission of the data file, or
    determine to cancel a file repair window which should follow the termination of transmission of the data file to the at least one UE.

10. The BM-SC of claim 7, wherein the memory further stores instructions which when executed by the processing unit causes the processing unit to save information about the number UEs reporting failure to successfully decode the data file and a packet loss percentage for the at least one UE of the at least one UE intended to receive the data file, and based on said saved information, to retransmit a certain percentage of repair symbols after the termination of transmission of the data file to the at least one UE, or using another time slot in the broadcast session to retransmit the data file.

11. A user equipment (UE) adapted for receiving a broadcast session comprising a data file from a Broadcast Multicast Service Centre (BM-SC), the UE comprising:
    a processor; and
    a memory storing instructions which when executed by the processor enable the UE to:
    receive a session from the BM-SC, comprising the data file and a FEC redundancy level used to transmit the data file;

initiate decoding of at least a part of the transmitted data file employing the indicated FEC redundancy level;
determine that a packet of the received data file is unsuccessfully decoded;
transmit, to the BM-SC, information, indicating that the data file could not be successfully decoded, and a packet loss rate indicative of the failed decoding; and
determine at least one action decisive of how to handle subsequent packet(s) of the data file to be initiated, in case it is found that the packet loss rate exceeds the FEC redundancy level.

12. The UE of claim 11, wherein the memory is further capable of storing instructions which when executed by the processor causes the processor to decode the received packet or data file according to the received FEC redundancy level, wherein if the decoding of the received transmission is unsuccessful, then the processor is further adapted to transmit information to the BM-SC indicating that the UE could not successfully decode the data file.

13. The UE of claim 12, wherein transmitting information to the BM-SC, indicating that the UE could not successfully decode the data file, comprises sending a Reception Report Request indicating the packet loss rate to the BM-SC.

14. The UE of claim 11, wherein the memory is further capable of storing instructions which when executed by the processor causes the processor to receive a plurality of packets, to determine a ratio between the number of packets which were not successfully decoded and the number of packets which were received, to determine a relationship between the FEC redundancy level and the determined ratio, and to abort the reception of further packets of the same data file within the broadcast session if the ratio is higher than the FEC redundancy level and if the file repair is not enabled for the delivered data file.

15. The UE of claim 11, wherein the memory is further capable of storing instructions which when executed by the processor causes the processor to indicate to the BM-SC that a file repair session with the BM-SC will be requested after the termination of the broadcast session in order to receive a retransmission of those packets which were indicated to the BM-SC as not successfully decoded.

* * * * *